United States Patent
McAninch et al.

(10) Patent No.: US 10,086,510 B1
(45) Date of Patent: Oct. 2, 2018

(54) DUAL ROBOTIC CASE PACKING SYSTEM FOR STANDUP PRODUCT

(71) Applicant: Fallas Automation, Inc., Waco, TX (US)

(72) Inventors: Mark McAninch, Lorena, TX (US);
Daniel Maeyaert, Waco, TX (US);
Jacob Cox, China Springs, TX (US);
James Norris, Waco, TX (US)

(73) Assignee: Fallas Automation, Inc., Waco, TX (US)

( * ) Notice: Subject to any disclaimer, the term of this patent is extended or adjusted under 35 U.S.C. 154(b) by 0 days.

(21) Appl. No.: 15/644,531

(22) Filed: Jul. 7, 2017

(51) Int. Cl.
| | |
|---|---|
| B25J 9/00 | (2006.01) |
| B65G 1/137 | (2006.01) |
| B25J 9/10 | (2006.01) |
| B65G 47/91 | (2006.01) |
| B65G 47/90 | (2006.01) |
| B65B 35/16 | (2006.01) |
| B65B 5/08 | (2006.01) |
| B65B 5/10 | (2006.01) |

(52) U.S. Cl.
CPC ........... *B25J 9/0093* (2013.01); *B25J 9/0051* (2013.01); *B25J 9/0084* (2013.01); *B25J 9/107* (2013.01); *B65B 5/08* (2013.01); *B65B 5/105* (2013.01); *B65B 35/16* (2013.01); *B65G 1/1376* (2013.01); *B65G 47/90* (2013.01); *B65G 47/91* (2013.01)

(58) Field of Classification Search
CPC .......... B25J 9/0084; B25J 9/0093; B65B 5/08
See application file for complete search history.

(56) References Cited

U.S. PATENT DOCUMENTS

| | | | |
|---|---|---|---|
| 1,388,668 | A | 8/1921 | Schumacher |
| 1,766,573 | A | 6/1930 | Westin |
| 2,235,725 | A | 3/1941 | Nordquist |
| 2,443,952 | A | 6/1948 | Gilbert |
| 2,597,069 | A | 5/1952 | Conti |
| 2,788,113 | A | 4/1957 | De Waal |

(Continued)

FOREIGN PATENT DOCUMENTS

| | | |
|---|---|---|
| CA | 2054074 C | 1/1996 |
| CA | 2117020 C | 9/2004 |

OTHER PUBLICATIONS

Premier Techno Chronos, YouTube video, "Case Packer/Robotic Case Packing Machine (RPK Series)", Published Jan. 7, 2016 (Screen captures 2 pgs), available at: https://www.youtube.com/watch?v=GEDfhHSqtRU&index=5&list=PLiXcJ-KOqmLiB7qd1yexPONO8cDIsUqpy.

*Primary Examiner* — Thomas Randazzo
(74) *Attorney, Agent, or Firm* — Brinks Gilson & Lione

(57) ABSTRACT

A case packing system for loading articles into containers includes an article conveyor for conveying articles, a case conveyor for conveying containers, and first, second, and third bins. A first robotic mechanism moves articles on the article conveyor to the first, second, and third bins. A second robotic mechanism moves articles from the first, second, and third bins to containers on the case conveyor. A controller operatively coupled to the first robotic mechanism and the second robotic mechanism is configured to pick and place with the first robotic mechanism one or more conveyed articles into the first, second, and third bins, and grab and load with the second robotic mechanism one or more articles from the first, second, and third bins into containers on the case conveyor.

20 Claims, 5 Drawing Sheets

(56) References Cited

U.S. PATENT DOCUMENTS

| | | |
|---|---|---|
| 2,849,116 A | 8/1958 | Fried |
| 2,905,310 A | 9/1959 | Stoeckel et al. |
| 2,941,676 A | 6/1960 | Harker |
| 2,948,417 A | 8/1960 | Haanes |
| 2,956,384 A | 10/1960 | Underwood |
| 3,022,620 A | 2/1962 | Gallet |
| 3,224,549 A | 12/1965 | Cella et al. |
| 3,319,767 A | 5/1967 | Bretermitz et al. |
| 3,389,906 A | 6/1968 | Walton |
| 3,445,980 A | 5/1969 | Salomon |
| 3,481,465 A | 12/1969 | Way |
| 3,488,917 A | 1/1970 | Oswald et al. |
| 3,512,336 A | 5/1970 | Rosecrans |
| 3,575,276 A | 4/1971 | Rupert |
| 3,590,972 A | 7/1971 | Mosterd |
| 3,614,853 A | 10/1971 | Seragnoli |
| 3,665,148 A | 5/1972 | Yasenchak et al. |
| 3,673,756 A | 7/1972 | Prete et al. |
| 3,673,759 A | 7/1972 | Ayres et al. |
| 4,976,582 A | 12/1990 | Clavel |
| 5,553,442 A * | 9/1996 | Fadaie .................. B65B 25/146 414/404 |
| 6,374,984 B1 | 4/2002 | Nagler |
| 6,540,063 B1 * | 4/2003 | Fallas .................... B65B 5/105 198/419.3 |
| 7,644,558 B1 * | 1/2010 | Fallas .................... B25J 9/0093 53/251 |
| 8,997,438 B1 * | 4/2015 | Fallas .................. B65G 47/914 414/222.01 |
| 9,452,851 B2 | 9/2016 | Viel et al. |
| 9,481,518 B2 * | 11/2016 | Neiser .................. B65G 1/1378 |
| 9,751,693 B1 * | 9/2017 | Battles ................. G06Q 10/087 |
| 2012/0029683 A1 * | 2/2012 | Keller .................... B25J 9/1687 700/214 |
| 2013/0041495 A1 * | 2/2013 | Moore .................. B25J 9/0084 700/112 |
| 2016/0039550 A1 | 2/2016 | Boudreau et al. |
| 2017/0080566 A1 * | 3/2017 | Stubbs .................. B25J 9/1679 |
| 2017/0297200 A1 * | 10/2017 | Stubbs .................. B25J 9/1679 |
| 2017/0369244 A1 * | 12/2017 | Battles .................. B65G 1/137 |
| 2018/0057263 A1 * | 3/2018 | Beer .................. B25J 15/0616 |

* cited by examiner

US 10,086,510 B1

DUAL ROBOTIC CASE PACKING SYSTEM FOR STANDUP PRODUCT

TECHNICAL FIELD

The present disclosure relates to a case packing system, and in particular, a dual robotic case packing system for loading articles from a moving conveyor into containers, such as corrugated cardboard boxes.

BACKGROUND

For many years, attempts have been made to develop improved systems for picking up individual articles from a conveyor or similar conveyor system and depositing those articles within a container, such as a corrugated cardboard box. The desire is to accomplish this task with speed and accuracy. To meet the demand for speed, past solutions have used multiple robots along the conveyor, such as described in Applicant's U.S. Pat. No. 6,540,063, which is incorporated herein by reference. Often, if four such robot heads are used, each head picks up every fourth article on the conveyor system in a staggered manner so that the four robot heads effectively remove four consecutive articles during each iteration. While this multiplicity of heads increases the packing speed, the means for moving the robot heads from the conveyor system to the container may be awkward or cumbersome to implement.

To provide greater flexibility, multi-axis robots have been developed for picking an article off of a common conveyor. Many such multi-axis robots, however, have proven to be fairly slow and heavy. Hence, while such robots may provide greater flexibility in motion, they have also provided a need for an even greater number of robots to meet the speed requirements in the marketplace today. Additionally, it has been found that with some three-axis robots, the range of movement may be limited in certain directions. For example, certain three-axis robots are very limited in their vertical component, which can make movement of an article from a conveyor into a deep container difficult to perform.

To provide even greater flexibility, multi-axis robots as disclosed in Applicant's U.S. Pat. No. 7,644,558 and U.S. Pat. No. 8,997,438, which are fully incorporated herein by reference, can be used for picking an article off of a common conveyor and placing the article in a container. The multi-axis robot can provide the desired speed of operation with the desired range of movement and can accurately pick articles from the conveying system and place them into containers.

Even with the improvements made so far in case packing, operators are continually striving for faster and more efficient systems for packing articles from a conveyor into containers. Operators are also striving to implement these systems in a manner that meets "shelf-ready packaging" (SRP) or "retail-ready packaging" (RRP) requirements. SRP and RRP generally refer to the preparation of a product that is delivered to a retailer in a ready-to-self merchandised unit. For example, SRP and RRP products can be easily placed on a shelf without the need for unpacking or repacking. In that regard, SRP and RRP products may be packaged in containers that allow the container to be shipped, stacked, and opened on a pallet in a manner that allows the product to be displayed in the opened container in an isle on the floor of a retail outlet. For example, SRP and RRP products may be packaged in a container in an upright or vertical position, aligned in one or more rows within the container, such that the product brand or name, and/or contents, can be seen while the product remains in the container.

BRIEF SUMMARY

In one aspect, a case packing system for loading articles into containers includes an article conveyor for conveying articles, a case conveyor for conveying containers, and first, second, and third bins. A first robotic mechanism moves articles on the article conveyor to the first, second, and third bins. A second robotic mechanism moves articles from the first, second, and third bins to containers on the case conveyor. A controller is operatively coupled to the first robotic mechanism and the second robotic mechanism. The controller is configured to pick and place with the first robotic mechanism one or more conveyed articles into the first, second, and third bins, and grab and load with the second robotic mechanism one or more articles from the first, second, and third bins into containers on the case conveyor.

The first robotic mechanism may pick and place one or more articles into one of the first, second, and third bins until the one bin is full of articles. The first robotic mechanism may pick and place one or more articles into the first, second, and third bins in the following repeating sequence: first bin, second bin, third bind, second bin.

The second robotic mechanism may grab and load one or more articles simultaneously from two of the first, second, and third bins. The second robotic mechanism may grab and load one or more articles simultaneously into two containers on the case conveyor. The second robotic mechanism may grab and load one or more articles from two of the first, second, and third bins in the following repeating sequence: first and second bin, second and third bin, first and second bin, second and third bin.

The first robotic mechanism may pick and place one or more articles from the article conveyor into the first, second, and third bins while the second robotic mechanism simultaneously grabs and loads one or more articles from the first, second, and third bins into containers on the case conveyor.

The controller may be operatively coupled to the article conveyor to control a speed of the article conveyor. The controller may be operatively coupled to the case conveyor to control positioning of containers on the case conveyor relative to the second robotic mechanism.

The first robotic mechanism and the second robotic mechanism may comprise multi-axis robots. The first robotic mechanism may have a vacuum pick handler for picking and placing one or more articles. The second robotic mechanism may have a plurality of multi-finger grippers for grabbing and loading one or more articles.

The first robotic mechanism may stack a plurality of articles in each of the first, second, and third bins. The second robotic mechanism may load articles into containers on the case conveyor in an upright position.

In another aspect, a case packing system for loading articles into containers includes an article conveyor for conveying articles, a case conveyor for conveying containers, and a plurality of bins. A first multi-axis robot has a handler for picking and placing articles on the article conveyor into the plurality of bins. A second multi-axis robot has a plurality of grippers for simultaneous grabbing and loading articles from at least two bins of the plurality of bins into containers on the case conveyor;

The first multi-axis robot picks and places articles on the article conveyor into the plurality of bins while the second multi-axis robot simultaneously grabs and loads articles form the plurality of bins into containers on the case conveyor.

The plurality of bins may comprise first, second and third bins, and the plurality of grippers may comprise two multi-finger grippers. The plurality of bins may comprise first, second, third, and fourth bins, and the plurality of grippers may comprise three multi-finger grippers.

The first robotic mechanism may stack a plurality of articles in each of the first, second, and third bins. The second robotic mechanism may load articles into containers on the case conveyor in an upright position.

In another aspect, a method of loading articles conveyed on an article conveyor into containers conveyed on a case conveyor includes picking one or more articles with a first multi-axis robot from the article conveyor and placing the articles into a plurality of bins in a sequence where each bin of the plurality of bins is filled sequentially, and simultaneously, grabbing a plurality of articles with a second multi-axis robot from at least two bins of the plurality of bins and loading the plurality of articles in an upright position into a plurality of containers conveyed on the case conveyor.

DETAILED DESCRIPTION OF THE PRESENTLY PREFERRED EMBODIMENTS

Figure 1:
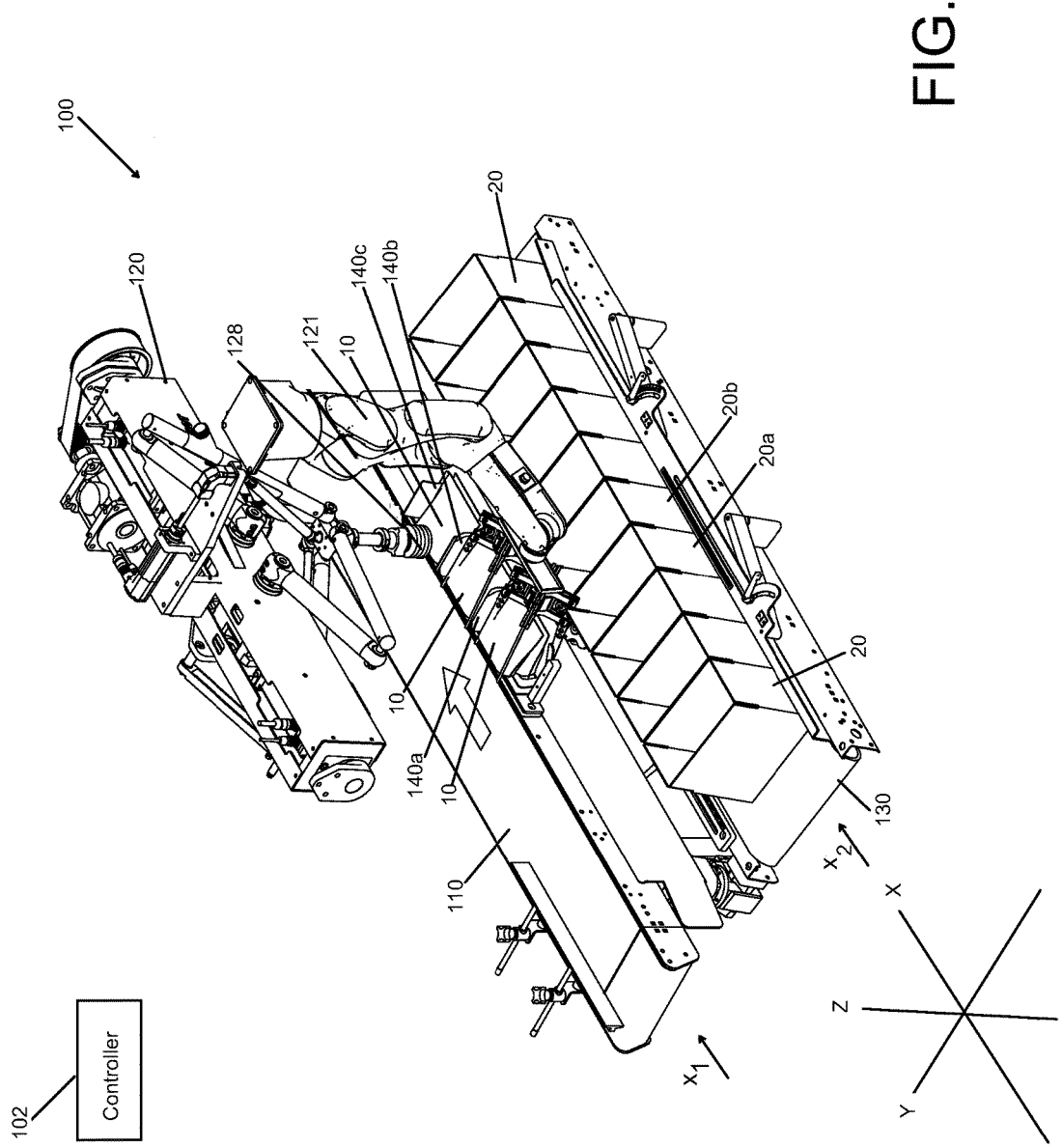
FIG. 1 is a perspective view of a robotic case packing system of the present disclosure.

Referring to FIG. 1-4, a robotic case packing system 100 according to the present disclosure includes an article conveyor 110, a case conveyor 130, a control system 102 (shown schematically), a first robotic mechanism in the form of a pick and place mechanism 120, and a second robotic mechanism in the form of a grip and load mechanism 121. The robotic case packing system 100 uses the pick and place mechanism 120 to pick articles 10 from the article conveyor 110 with a handler 128 and stack the picked article(s) 10 into one of three intermediate bins 140a-c or chambers. In turn, the grip and load mechanism 121 grabs the articles 10 from the intermediate bins 140a-c with grippers 122 and places the articles 10 into containers 20 (e.g., boxes) moved in position on the case conveyor 130 below. The articles 10 can be packages, bags, boxes, or any other type of item or product that can be loaded onto the article conveyor 110.

Figure 2:
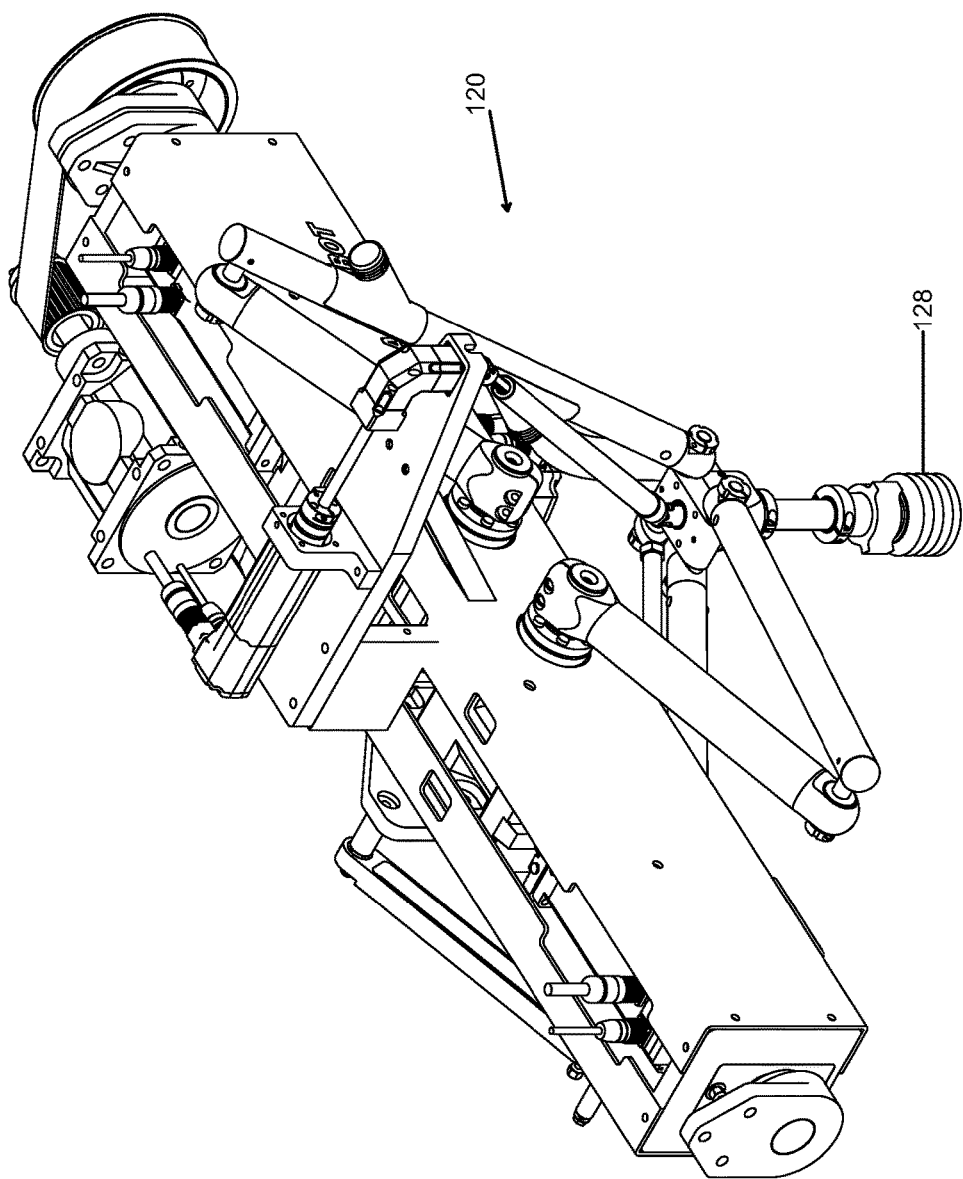
FIG. 2 is a perspective view of an exemplary first robotic mechanism of the system of FIG. 1.

As illustrated in FIGS. 1 and 2, the pick and place mechanism 120 is a multi-axis pick and place robotic device. For example, the pick and place mechanism 120 may be a multi-axis robotic device having a two-axis robot and a pivot to move the handler 128 in three axes (X, Y, Z) similar to some robots disclosed in Applicant's incorporated U.S. Pat. Nos. 7,644,558 and 8,997,438. A suitable type of a six-axis robotic device is the Fallas Automation R700 Adabot, shown in FIG. 2, or any comparable pick and place six-axis robot. A suitable type of a three-axis robotic device is the ABB Flexpicker system or any comparable delta robot, such as described in U.S. Pat. No. 4,976,582, the entirety of which is herein incorporated by reference. In any event, any suitable type of robotic mechanism can be used and can be actuated by pneumatics, electricity, hydraulics, or the like.

For its part, the handler 128 on the pick and place mechanism 120 can use a suction cup, a mechanical gripper, or other device to pick up and release the articles 10. For example, the handler 128 can be a vacuum pick assembly for selectively vacuuming and holding an article or articles 10 from the conveyor 110 and subsequently releasing the articles 10 when and where desired. It will be appreciated by those of skill in the art that other devices for handling the articles 10 may be used.

Preferably, the pick and place mechanism 120 picks up individual articles 10 from the article conveyor 110 and stacks the articles 10 one on top of another in one of the intermediate bins 140a-c at a time. For example, the articles 10 are placed flat in the intermediate bins 140a-c, being stacked by the pick and place mechanism 120 from the article conveyor 10, as shown in FIG. 1. As explained below, because the articles 10 may be flat and can be stacked flat on top of one another in the intermediate bins 140a-c, the articles 10 may fill containers 20 standing up inside the containers 20 after loading by the grip and load mechanism 121.

Figure 3:
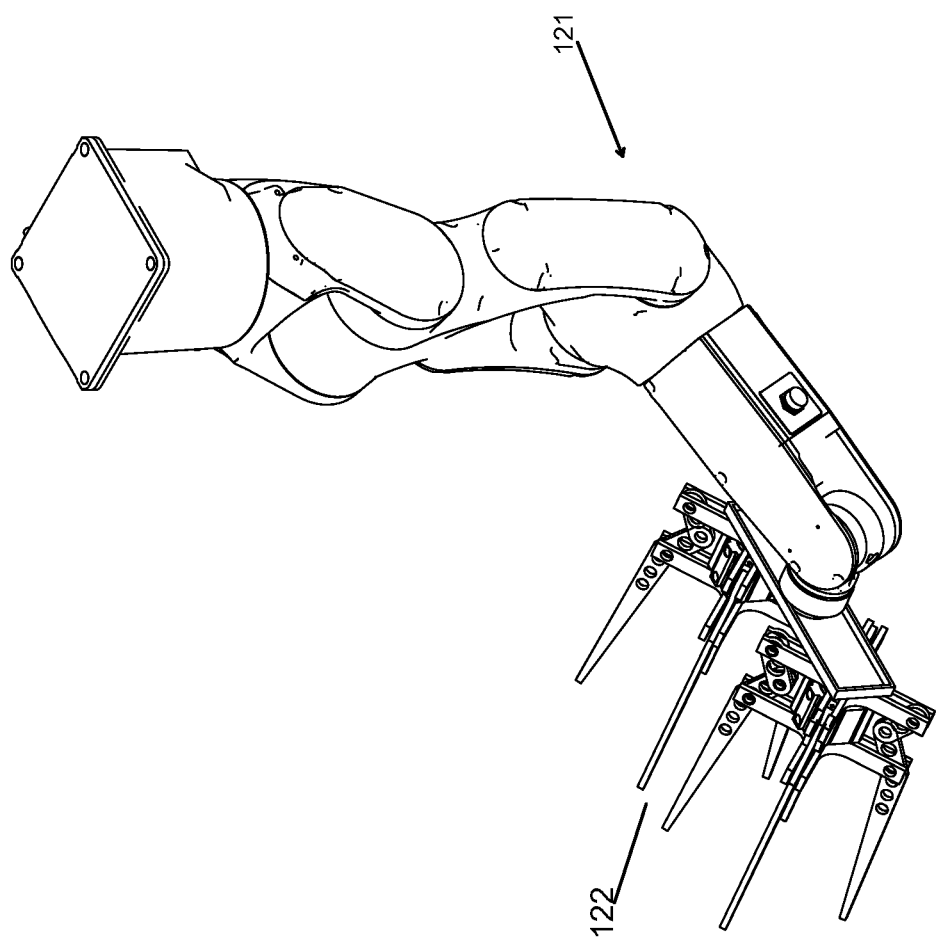
FIG. 3 is a perspective view of an exemplary second robotic mechanism of the system of FIG. 1.
Figure 4:
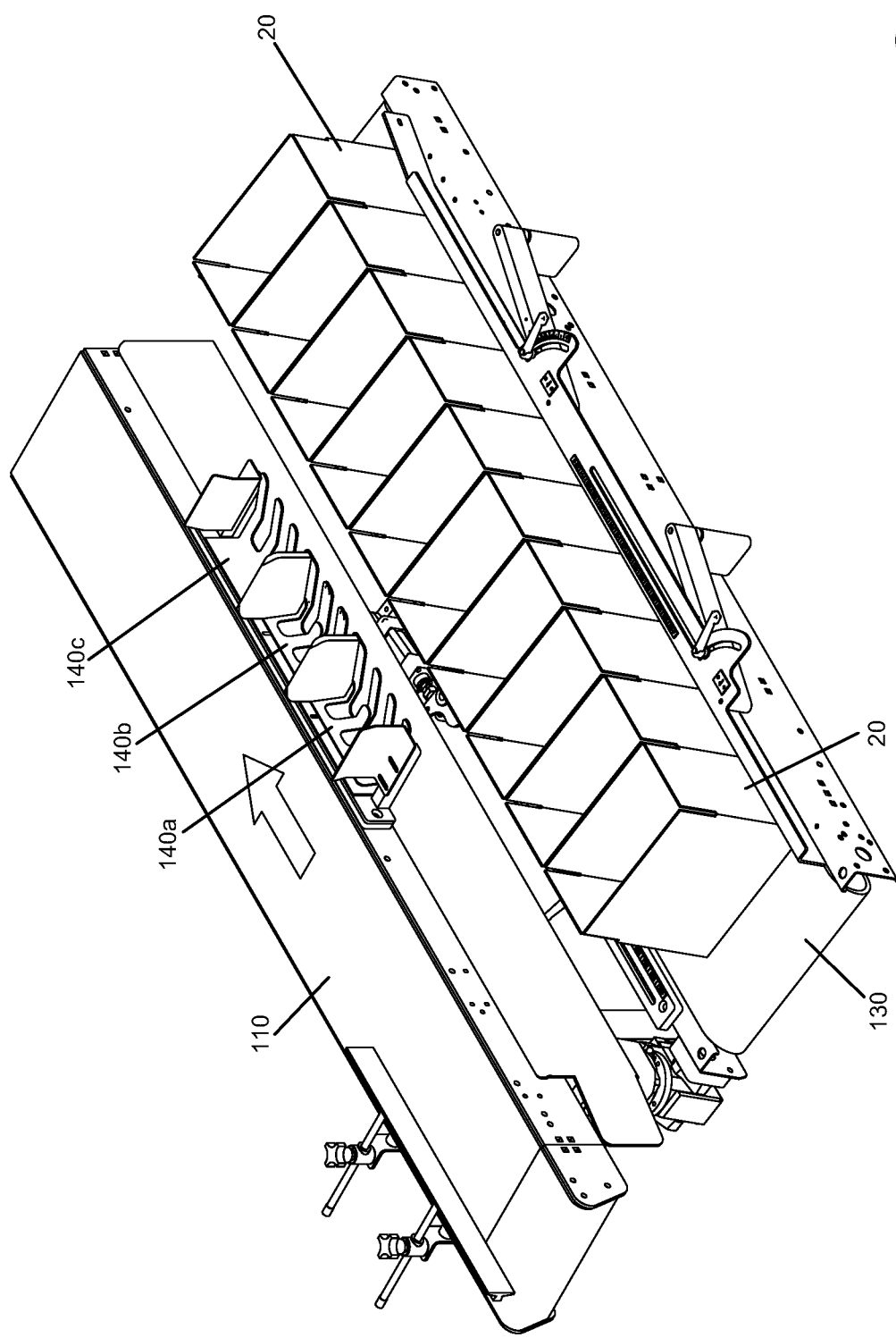
FIG. 4 is a perspective view of an article conveyor, intermediate bins, and a case conveyor of the system of FIG. 1; and, FIG. 5 is a flow chart showing operation of the disclosed system.

As illustrated in FIGS. 1 and 3, the grip and load mechanism 121 is a multi-axis grip and load robotic device. For example, the grip and load mechanism 121 may be a multi-axis robotic device having a series of pivots and joints to move the grippers 122 in three axes (X, Y, Z). Suitable types of six-axis robotic devices include the Fanuc LR Mate series, and in particular, the LR Mate 200iD/7C. In any event, any suitable type of robotic mechanism can be used and can be actuated by pneumatics, electricity, hydraulics, or the like.

For its part, the grippers 122 on the grip and load mechanism 121 may comprise a mechanical gripper, such as a three-finger or four-finger gripper, or other device to grab the articles 10 from the intermediate bins 140a-c and place the articles into containers 20. For example, the grippers 122 may comprise two four-finger grippers for selectively and simultaneously grabbing an article or stacks of articles 10 from intermediate bins 140a-b, or from intermediate bins 140b-c, then subsequently loading the articles 10 into one or more containers 20, when and where desired. It will be appreciated by those of skill in the art that other devices for handling the articles 10 may be used.

Preferably, the grip and load mechanism 121 grabs the stacked articles 10 from intermediate bins 140a-c, and rotates them to an upright position for loading into articles 10 standing up inside containers 20. This can be a preferred way to pack certain types of articles 10 in the containers 20. Other articles and products may preferably be laid and stacked flat inside the containers. The relative positions of the pick and place mechanism 120, the grab and load mechanism 121, the article conveyor 110, and the case conveyor 130 may be adjusted to accommodate whether articles are to be loaded in an upright position, or stacked flat inside the containers 20.

In FIG. 1, the pick and place mechanism 120 is disposed above the article conveyor 130 with intermediate bins 140a-c positioned roughly on either side of the mechanism's vertical axis Z. For their part, the intermediate bins 140a-c are disposed next to the article conveyor 110 and positioned above the case conveyor 130. To speed up the packing, the system 100 operates in an alternating fashion with the three intermediate bins 140a-c as described below.

The controller 102 selectively actuates the pick and place mechanism 120 to move to the article conveyor 110 and pick up an article or articles 10, following which the pick and place mechanism 120 moves the article(s) 10 to one of the intermediate bins 140a-c. This is repeated as many times as needed to fill the intermediate bins 140a-b, or intermediate bins 140b-c, at which point the controller 102 selectively actuates the grip and load mechanism 121 to move to the articles 10 from intermediate bins 140a-b, or from intermediate bins 140b-c, to the containers 20a-b on the case conveyor 130 below.

As will be detailed below, the controller 102 preferably instructs the pick and place mechanism 120 to fill the first intermediate bin (e.g., 140a), followed by the second intermediate bin (e.g., 140b), followed by the third intermediate bin (e.g., 140c), followed by the second intermediate bin (e.g., 140b), followed by the first intermediate bin (e.g., 140a), followed by the second intermediate bin (e.g., 140b), and so on. The number of articles 10 required to fill one intermediate bin (e.g., 140a) may depend on the size of the articles 10, the size of the intermediate bin (e.g., 140a), and the size of the containers 20. A bin 140a-c may be considered "full" even if the bin is not physically completely full of articles 10. Solely by way of example, if two articles 10 are required to fill one intermediate bin (e.g., 140a), the loading sequence of the pick and place mechanism 120 in intermediate bins 140a-c may be: 140a, 140a, 140b, 140b, 140c, 140c, 140b, 140b, 140a, 140a, 140b, 140b, and so on.

Once two intermediate bins (e.g., 140a-b, or 140b-c) are full, the controller 102 preferably instructs the grip and load mechanism 121 to grab the articles 10 from the intermediate bins 140a-b, or from intermediate bins 140b-c, and place the articles into containers 20a-b. The grip and load mechanism preferably grabs articles 10 from two full intermediate bins (e.g., 140a-b, or 140b-c), loading the articles 10 into two containers 20a-b at a time. Solely by way of example, the loading sequence of the grab and load mechanism 121 may therefore be: 140a and 140b, 140b and 140c, 140a and 140b, 140b and 140c, and so on. In alternative embodiments, the stacks of articles 10 from two intermediate chambers (e.g., 140a-b, or 140b-c) may be loaded side by side into a single container 20.

While the grip and load mechanism 121 grabs and loads articles 10 from the intermediate bins (e.g., 140a-b, or 140b-c), the controller 102 preferably instructs the pick and place mechanism 120 to load the remaining empty intermediate bins 140a-c. When two containers 20a-b are full, the controller 102 preferably instructs the case conveyor 130 to move the full containers 20a-b along the conveyor, and to move two new empty containers 20 to below the grip and load mechanism 121. The controller 102 then repeats this sequence.

Specific features of the controller 102 and how it communicates with the various motors, actuators, sensors, and the like in the system 100 are omitted, as they will be generally understood by one skilled in the art. In general, however, the controller 102 includes one or more processing units and memory and uses software to operate the various functions of the system 100. The controller 102 may comprise a plurality of individual controllers. The controller 102 can use a combination of any number of commercially available software packages and sensing mechanisms available in the marketplace for use with a multi-axis robot and conveyor systems. For example, available automation software and controls can be used in conjunction with the robotics to actuate and control the motion of the pick and place mechanism 120 and the grip and load mechanism 121 in response to input from stimuli, such as from a photo cell or other sensor.

During operation, the article conveyor 110 delivers articles 10 in a spaced manner (which spacing may be regular or random). Preferably, the delivery is at a known, constant speed, but this is not strictly necessary. To accurately monitor and control the known speed, the article conveyor 110 can use a geared belt similar to a timing belt with an encoder. Additionally, sensors can detect passage and/or placement of the article(s) 10 to coordinate the movements of the pick and place mechanism 120 and the grip and load mechanism 121. Such sensors can use any suitable imaging systems, and can even determine the placement of articles 10 across the width of the conveyor 10 so the articles 10 do not need to be individually conveyed in a line.

A set of combining conveyors (not shown) separately operated by motors may combine or organize several articles 10 together on the article conveyor 110 so the wider handler 128 can grip the set of articles 10 together for placing in the intermediate bins 140a-c. While articles 10 on the conveyor 110 may be individually spaced, picked, and placed, other options for conveying the articles 10 can be used as will be appreciated.

One or more support frames (not shown) supports the pick and place mechanism 120 and the grip and load mechanism 121 relative to the conveyors 110, 130 so the mechanism 120 can move the handler 128 along a desired path of operation to selectively pick the articles 10 from the article conveyor 110 and place the articles 10 in the intermediate bins 140a-c, and so that the mechanism 121 can move the grippers 122 along a desired path of operation to selectively pick the articles 10 from the intermediate bins 140a-c and place the articles 10 in the containers 20 below. The support frame(s) (not shown) can have any of a variety of shapes and configurations suitable for providing requisite stability and support for the pick and place mechanism 120 and the grip and load mechanism 121. That is, the support frame(s) may be a stand-alone frame that is operatively associated with the conveyors 110, 130 to properly align the pick and place mechanism 120 and the grip and load mechanism 121 with the conveyors 110, 130. Alternatively, the support frame(s) may be part of a framework attached to a building in which the case packing system 100 is housed and utilized.

The system 100 can use any of a number of readily available and suitable conveyor systems that deliver articles 10 and containers 20 at a desired rate for handling. For example, the article conveyor 110 is positioned below and slightly to one side of the pick and place mechanism 120 and can have a conveyor belt moved by a motor. Similarly, the case conveyor 130 is positioned below and slightly to one side of the pick and place mechanism 120 and can have a conveyor belt moved by a motor. As an alternative to the belt and motor systems, either one or the both of the conveyors 110 and 130 can have systems using actuatable rollers or other suitable types of conveyance mechanism. The grip and load mechanism 121 is generally positioned above the case conveyor 130.

As shown, the case conveyor 130 is positioned parallel to the article conveyor 110. The case conveyor 130 is further positioned to be a pre-selected distance from the article conveyor 110 and to be horizontally below the article conveyor 110 to accommodate movement by the pick and place mechanism 120 and the grip and load mechanism 121.

The case conveyor 130 may have an inside rail that properly places the containers 20 below the grip and load mechanism 121 and a biased rail the pushes the containers 20 against the inside rail. The case conveyor 130 moves corrugated cardboard cases or similar containers 20 in a conveyance direction $X_2$ parallel to the conveyance direction $X_1$ of the article conveyor 110. While parallel, the conveyance directions $X_2$ and $X_1$ may be in the same direction or in opposite directions. Alternatively, the conveyance directions may be perpendicular to one another, which may require the grip and load mechanism 121 to rotate the articles 10 an additional 90° before loading into containers 20.

The case conveyor 130 moves the containers 20 to pre-selected spots to receive the articles 10 from the grip and load mechanism 121. The case conveyor 130 may be configured to periodically start and stop as the containers 20 are moved to the pre-selected spots for loading by the grip and load mechanism 121. Alternatively, the case conveyor may be configured to remain in motion while the containers 20 are loaded by the grip and load mechanism 121. The case conveyor 130 may also include a case erector (not shown) for constructing corrugated cardboard cases or similar containers and moving them to the desired position for receipt of articles.

Figure 5:
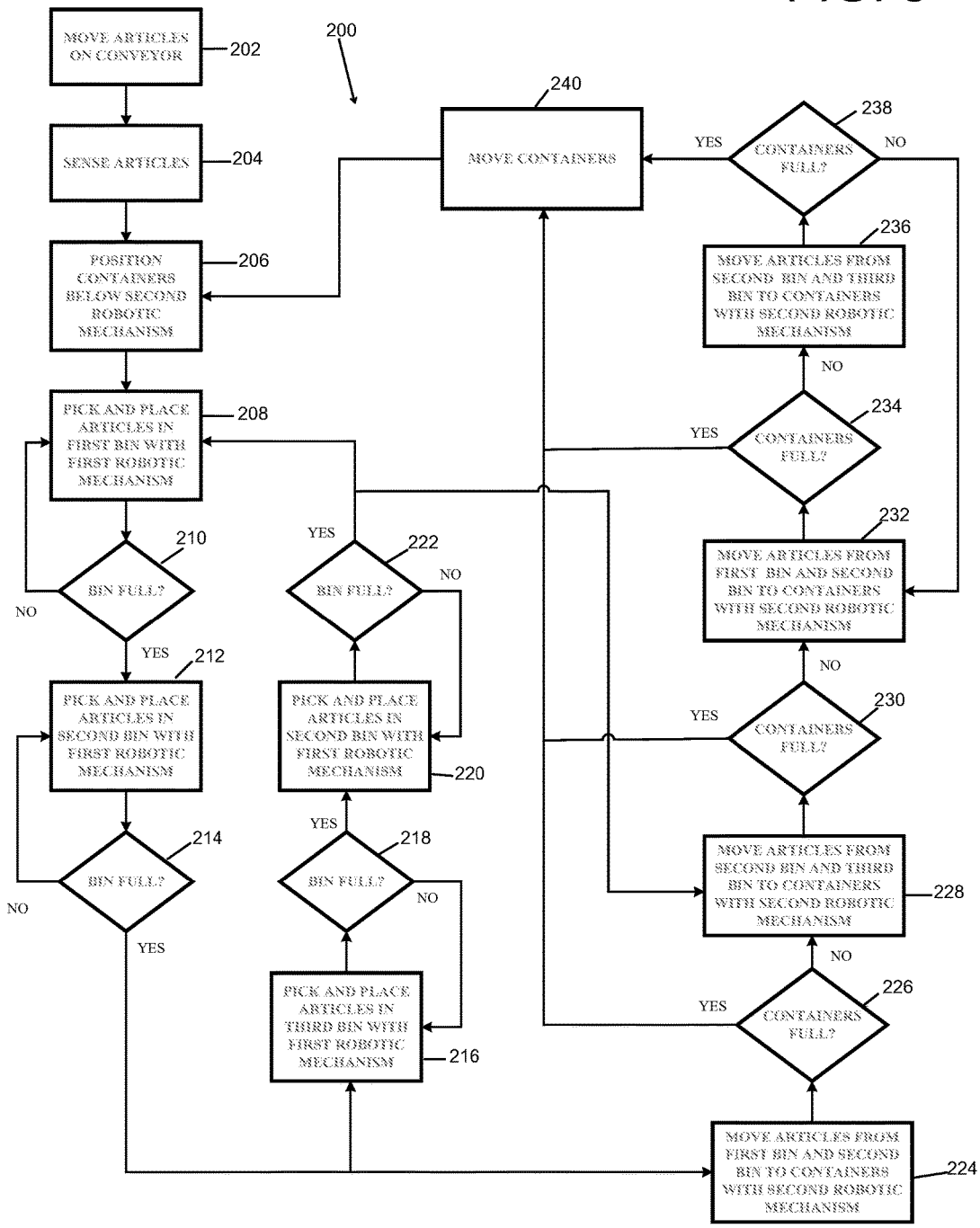

With an understanding of the case packing system 100, discussion now turns to a packing process 200 shown in FIG. 5. The controller 102 operates the article conveyor 110 to move the articles 10 next to the pick and place mechanism 120 (Block 202). To coordinate the timing of the pick and place mechanism 120 and the feed of the articles 10 on the article conveyor 110, the controller 102 controls the speed of the conveyor 110 and the mechanism 120 based on sensing the movement of the articles 10 with a sensor, such as a photo cell or other imaging system (Block 204).

The controller 102 also controls the position of the containers 20 on the case conveyor 130, positioning the containers 20 below the grip and load mechanism 121 (Block 206). Delivery of the containers 20 can be controlled by operating the conveyor 130 and one or more stops. An encoder on the conveyor belt and/or a sensor may also be used as part of this process to position the containers 20.

As the controller 102 moves the articles 10 on the conveyor 110 and senses the articles 10, the controller 102 operates the pick and place mechanism 120 by first picking and placing the articles 10 from the article conveyor 110 into the first intermediate bin 140a (Block 208). The picking and placing continues until the first bin 140a is full (Decision 210).

At this point, as the controller 102 continues to move the articles 10 on the conveyor 110 and sense the articles 10, the controller 102 operates the pick and place mechanism 120 by then picking and placing the articles 10 from the article conveyor 110 into the second intermediate bin 140b in a second pick and place operation (Block 212). The picking and placing continues until the second bin 140b is full (Decision 214).

At this point, the controller 102 also operates the grab and load mechanism 121, such that the pick and place mechanism 120 and the grab and load mechanism 121 operate simultaneously, or in parallel. Continued operation of the pick and place mechanism 120 will be described first, followed by description of the simultaneous operation of the grab and load mechanism 121.

As the controller 102 continues to move the articles 10 on the conveyor 110 and sense the articles 10, the controller 102 operates the pick and place mechanism 120 by then picking and placing the articles 10 from the article conveyor 110 into the third intermediate bin 140c in a third pick and place operation (Block 216). The picking and placing continues until the third bin 140c is full (Decision 218).

At this point, as described below, the controller has instructed the grab and load mechanism 121 to grab the articles in the first intermediate bin 140a and the second intermediate bin 140b, such that the first intermediate bin 140a and the second intermediate bin 140b are emptied (Block 224). Thus, as the controller 102 continues to move the articles 10 on the conveyor 110 and sense the articles 10, the controller 102 may operate the pick and place mechanism 120 by then picking and placing the articles 10 from the article conveyor 110 into the now empty second intermediate bin 140b (Block 220). Again, the picking and placing continues until the second bin 140b is full (Decision 222). When the second bin 140b is full, the controller may operate the pick and place mechanism 120 by then picking and placing the articles 10 from the article conveyor 110 into the now empty first intermediate bin 140b (Block 208). The controller 102 may then repeat this loading sequence.

As previously mentioned, after the second intermediate bin 140b is full (Decision 214), the controller 102 also operates the grab and load mechanism 121, such that the pick and place mechanism 120 and the grab and load mechanism 121 operate simultaneously, or in parallel. Specifically, the controller 102 operates the grab and bad mechanism 121 to grip the articles 10 stacked in first and second intermediate bins 140a and 140b, and to move the articles into to an upright position in two containers 20a-b below (Block 224). The grabbing and loading continues until the two containers 20a-b are full (Decision 226). If the containers are full, the containers are moved (Block 228), such that two empty new containers 20 are moved below the grab and load mechanism 121 (Block 206).

If the containers 20 are not full, and as the intermediate bins 140a-c are continued to be loaded, as discussed above, the controller 102 operates the grab and load mechanism 121 to grip the articles 10 stacked in second and third intermediate bins 140b and 140c, and to move the articles into an upright position in the two containers 20a-b below (Block 228). Again, the grabbing and loading continues until the two containers 20a-b are full (Decision 230). If the containers are full, the containers are moved (Block 228), such that two empty new containers 20 are moved below the grab and load mechanism 121 (Block 206).

At this point, if the containers 20 are not full, and as the intermediate bins 140a-c are continued to be loaded, as discussed above, the controller 102 operates the grab and load mechanism 121 to grip the articles 10 stacked in the first and second intermediate bins 140a and 140b, and to move the articles 10 into an upright position in the two containers 20a-b below (Block 232). The grabbing and loading continues until the two containers 20a-b are full (Decision 234). If the containers are full, the containers are moved (Block 228), such that two empty new containers 20 are moved below the grab and load mechanism 121 (Block 206).

At this point, if the two containers 20a-b are not full, the controller 102 operates the grab and load mechanism 121 to grip the articles 10 stacked in the second and third intermediate bins 140b and 140c, and to move the articles 10 into to an upright position loaded into the two containers 20a-b below (Block 236). The grabbing and loading continues until the two containers 20a-b are full (Decision 238). If the containers are full, the containers are moved (Block 228), such that two empty new containers 20 are moved below the grab and load mechanism 121 (Block 206). If the containers 20 are not full, the controller 102 may then repeat this loading sequence again.

With both of the containers 20a-b filled, the controller 102 operates the case conveyor 130 to move the two containers 20a-b (Block 228) to be closed and sealed, for example. At this point, the controller 102 now positions two new empty containers 20 on the case conveyor 130 below the grab and load mechanism 121 (Block 206), and the process 200 continues as before.

As can be seen in the above process 200, the pick and place mechanism 120 can fill one of the intermediate bins 140a-c at one time and can subsequently switch to fill another of the intermediate bins 140a-c. In other embodiments, the pick and place mechanism 120 can alternatingly pick and place articles in each of the bins 140a-c at the same time. However, the sequential operation of filling one bin 140a, followed by the second bin 140b, followed by the third bin 140c, is preferred because the full intermediate bins (e.g., 140a-b) can be emptied by the grab and load mechanism 121 into the containers 20 while the other intermediate bin (e.g., 140c) is being filled by the pick and place mechanism 120. In this way, the pick and place mechanism 120 does not have down time when it has to wait for the emptying of the bins 140a-b. Still, the system 100 can use a combination of alternating and sequential filling of the bins 140a-c. The programming of the system 100 can be based on the number of articles 10 needed to fill the bins 140a-c, how fast the bins 140a-c can be emptied by the grab and load mechanism 121, and whether the robotics of the pick and place mechanism 120 or the grab and load mechanism 121 benefit from repeating sequentially movements or making alternating movements.

In the embodiment of FIG. 1, one pick and place mechanism 120 and one grab and load mechanism 121 is shown. In alternative embodiments for handling greater article quantities at greater speed, two or more pick and place mechanisms 120 and two or more grab and load mechanisms 121 may be positioned and aligned along the article conveyor 110 to increase the quantity of articles 10 that may be handled off the conveyor 110. In this alternative (not shown), if two pick and place mechanisms 120 and two grab and load mechanisms 121 are utilized, then the first pick and place mechanism may, for example, pick up the first, third, fifth, etc. article 10 on the article conveyor 110; and the second pick and place mechanism may pick up the second, fourth, sixth, etc. article 10 on the article convey 110. The number of articles 10 that each mechanism picks up before passing on an article 10 will depend on the article rate, and has substantial flexibility. In this configuration, the containers 20 may be selectively spaced below the multiple grab and load mechanisms 121.

Generally, it may be advantageous (especially if the articles 10 are randomly spaced) to have each mechanism 120 in the line pick up as many articles 10 in a row as it is able to pick before passing on an article 10. The use of two or more pick and place mechanisms 120 aligned along the article conveyor 110 thereby enables the handling of a multiple number of articles 10 in the same amount of time. Additionally, the number of articles 10 that may be loaded into each container 20 is not affected by the number of pick and place mechanisms 120 as sometimes the case with prior devices. It will be appreciated by those of skill in the art in light of the present disclosure that yet additional pick and place mechanisms 120 may be aligned along the conveyor in accordance with the present invention in order to increase the speed of handling. Through the use of additional mechanisms 120, the only limitation on the number of articles that may be handled is the speed of the conveyor 110.

In the embodiment of FIG. 1, three intermediate bins 140a-c are shown, along with grippers 122 comprising two multifinger grippers for selectively and simultaneously grabbing an article or stacks of articles 10 from intermediate bins 140a-b, or from intermediate bins 140b-c, then simultaneous loading into two containers 20. In alternative embodiments for handling greater or different article quantities or configurations, additional intermediate bins and additional grippers may be added to the system 100. For example, the system could include four intermediate bins 140a-d, with grippers 122 comprising three multifinger grippers for selectively and simultaneously grabbing an article or stacks of articles 10 from intermediate bins 140a-c, or from intermediate bins 140b-d, for simultaneous loading into three containers 20 positioned below. In this configuration, the pick and place mechanism 120 would therefore execute a loading sequence for the four intermediate bins 140a-d as follows: fill first intermediate bin 140a, fill second intermediate bin 140b, fill third intermediate bin 140c, fill fourth intermediate bin 140d, fill third intermediate bin 140c, fill second intermediate bin 140b, fill first intermediate bin 140a, fill second intermediate bin 140b, and so on. In this configuration, the grab and load mechanism 121 would therefore execute a loading sequence grabbing articles from intermediate bins 140a-d as follows: 140a-c, 140b-d, 140a-c. 140b-d, and so on. It will be appreciated that additional intermediate chambers and/or additional grippers may be used to accommodate alternative article quantities or configurations.

The foregoing description of preferred and other embodiments is not intended to limit or restrict the scope or applicability of the inventive concepts conceived of by the Applicant. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed:

1. A case packing system for loading articles into containers, the system comprising:
   an article conveyor for conveying articles;
   a case conveyor for conveying containers;
   first, second, and third bins;
   a first robotic mechanism for moving articles on the article conveyor to the first, second, and third bins;
   a second robotic mechanism for moving articles from the first, second, and third bins to containers on the case conveyor; and,
   a controller operatively coupled to the first robotic mechanism and the second robotic mechanism, the controller configured to:
      pick and place with the first robotic mechanism one or more conveyed articles into the first, second, and third bins; and,
      grab and load with the second robotic mechanism one or more articles from the first, second, and third bins into containers on the case conveyor.

2. The system of claim 1, wherein the first robotic mechanism picks and places one or more articles into one of the first, second, and third bins until the one bin is full of articles.

3. The system of claim 1, wherein the first robotic mechanism picks and places one or more articles into the first, second, and third bins in the following repeating sequence: first bin, second bin, third bin, second bin.

4. The system of claim 1, wherein the second robotic mechanism grabs and loads one or more articles simultaneously from two of the first, second, and third bins.

5. The system of claim 1, wherein the second robotic mechanism grabs and loads one or more articles simultaneously into two containers on the case conveyor.

6. The system of claim 1, wherein the second robotic mechanism grabs and loads one or more articles from two of the first, second, and third bins in the following repeating sequence: first and second bin, second and third bin, first and second bin, second and third bin.

7. The system of claim 1, wherein the first robotic mechanism picks and places one or more articles from the article conveyor into the first, second, and third bins while the second robotic mechanism simultaneously grabs and loads one or more articles from the first, second, and third bins into containers on the case conveyor.

8. The system of claim 1, wherein the controller is operatively coupled to the article conveyor and controls a speed of the article conveyor.

9. The system of claim 1, wherein the controller is operatively coupled to the case conveyor and controls positioning of containers on the case conveyor relative to the second robotic mechanism.

10. The system of claim 1, wherein the first robotic mechanism and the second robotic mechanism comprise multi-axis robots.

11. The system of claim 1, wherein the first robotic mechanism comprises a vacuum pick handler for picking and placing one or more articles.

12. The system of claim 1, wherein the second robotic mechanism comprises a plurality of multi-finger grippers for grabbing and loading one or more articles.

13. The system of claim 1, wherein the first robotic mechanism stacks a plurality of articles in each of the first, second, and third bins.

14. The system of claim 1, wherein the second robotic mechanism loads articles into containers on the case conveyor in an upright position.

15. A case packing system for loading articles into containers, the system comprising:
an article conveyor for conveying articles;
a case conveyor for conveying containers;
a plurality of bins;
a first multi-axis robot having a handler for picking and placing articles on the article conveyor into the plurality of bins; and,
a second multi-axis robot having a plurality of grippers for simultaneously grabbing and loading articles from at least two bins of the plurality of bins into containers on the case conveyor;
wherein the first multi-axis robot picks and places articles on the article conveyor into the plurality of bins while the second multi-axis robot simultaneously grabs and loads articles form the plurality of bins into containers on the case conveyor.

16. The system of claim 15, wherein the plurality of bins comprises first, second and third bins, and the plurality of grippers comprises two multi-finger grippers.

17. The system of claim 15, wherein the plurality of bins comprises first, second, third, and fourth bins, and the plurality of grippers comprises three multi-finger grippers.

18. The system of claim 15, wherein the first robotic mechanism stacks a plurality of articles in each of the first, second, and third bins.

19. The system of claim 15, wherein the second robotic mechanism loads articles into containers on the case conveyor in an upright position.

20. A method of loading articles conveyed on an article conveyor into containers conveyed on a case conveyor, the method comprising:
picking one or more articles with a first multi-axis robot from the article conveyor and placing the one or more articles into a plurality of bins in a sequence where each bin of the plurality of bins is filled sequentially; and simultaneously,
grabbing a plurality of articles with a second multi-axis robot from at least two bins of the plurality of bins simultaneously and loading the plurality of articles in an upright position into a plurality of containers conveyed on the case conveyor.

* * * * *